United States Patent Office 3,329,099
Patented July 4, 1967

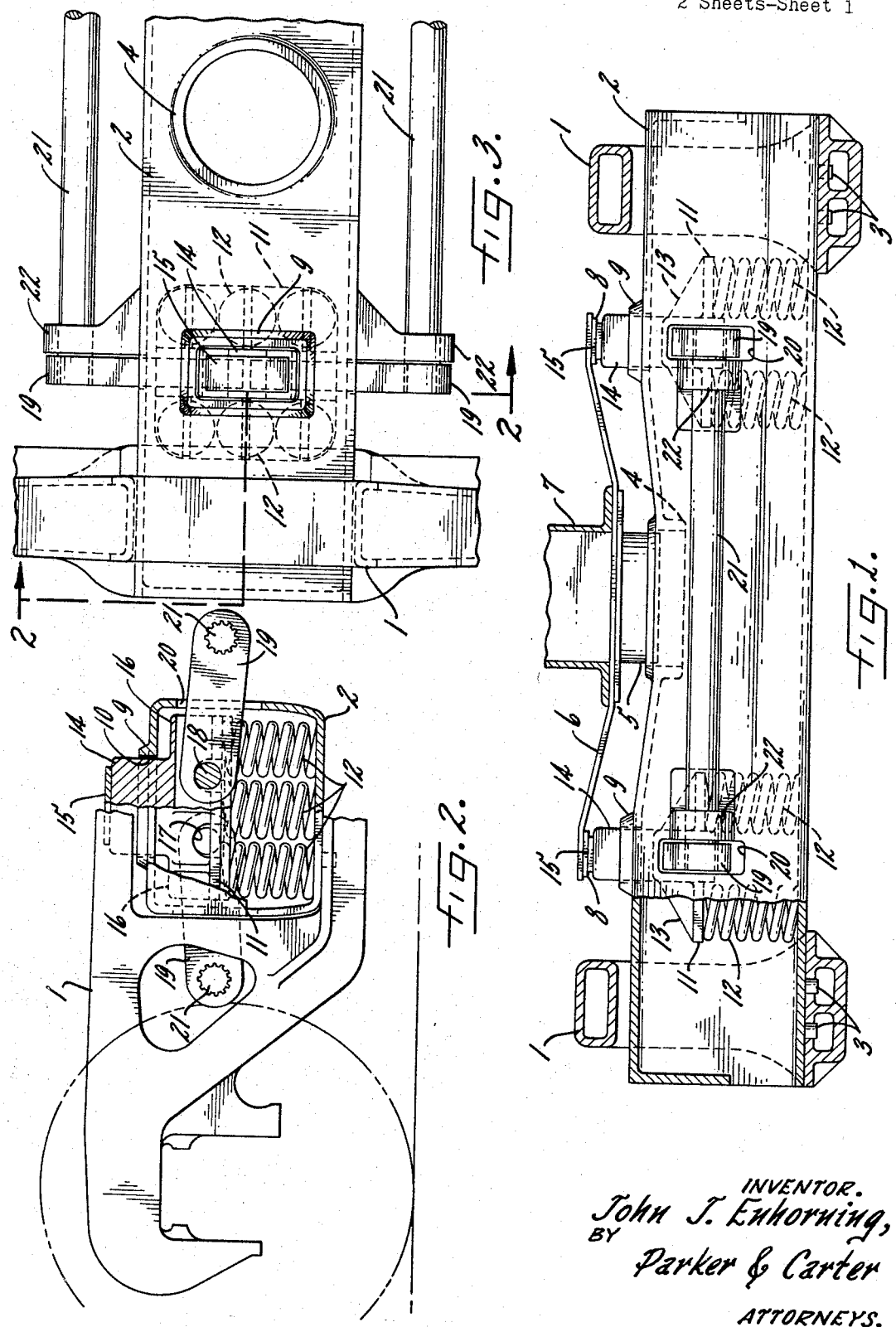

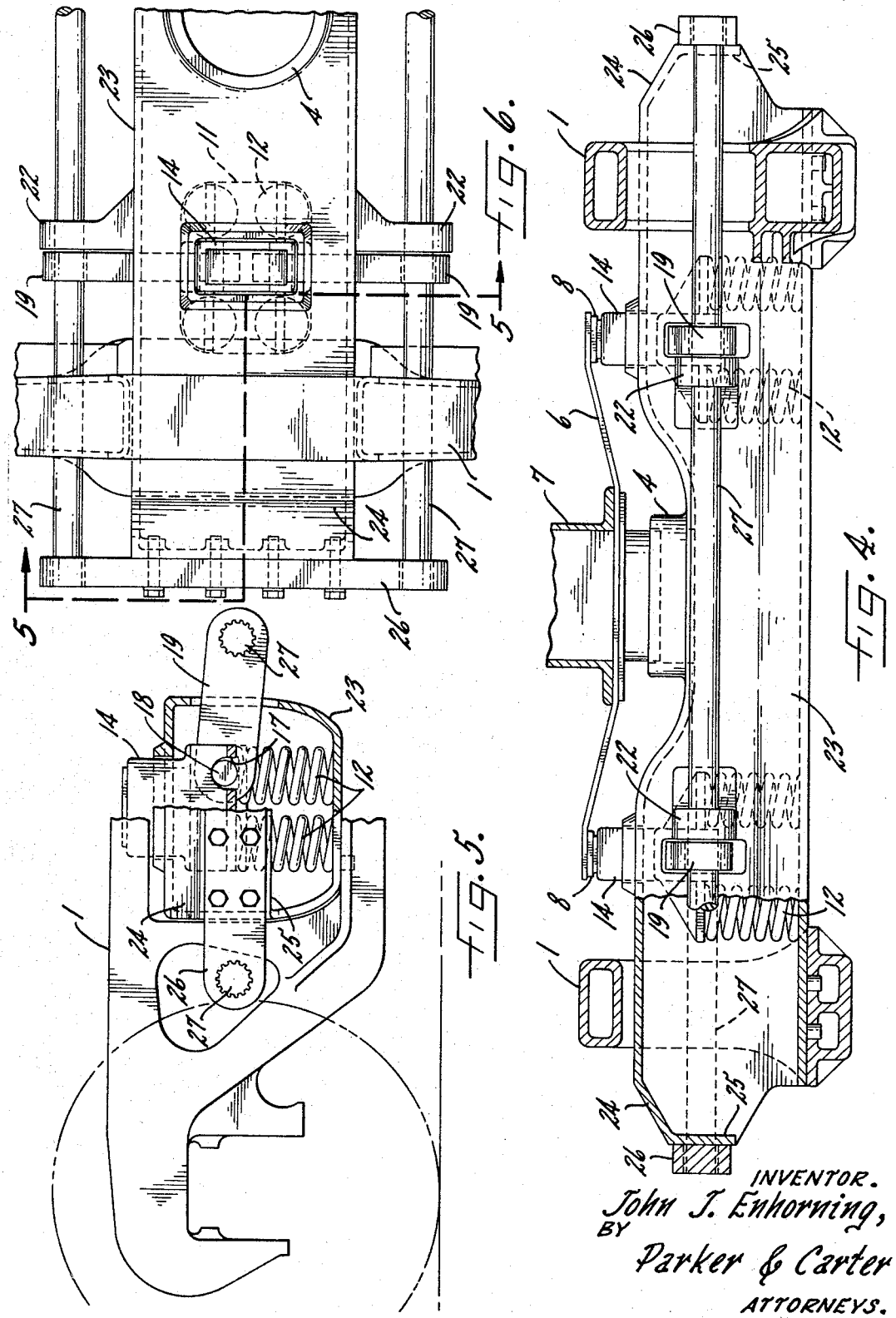

3,329,099
RAILROAD CAR TRUCKS WITH SPRING BIASED SIDE BEARINGS
John J. Enhorning, Chicago, Ill., assignor to Standard Car Truck Company, Chicago, Ill., a corporation of Illinois
Filed Feb. 18, 1965, Ser. No. 433,689
2 Claims. (Cl. 105—199)

This invention relates to railroad car trucks wherein the load of the car is carried at points widely spaced from the pivot axis of the car and truck center plates and where no vertical load is applied to the center plates.

Another object is to provide a truck arrangement whereby the springs supporting the load on both sides of the car are constrained to equal vertical expansion and contraction.

Another object is to make it possible to position the load carrying springs between the car truck side frames and the center plate thereby simplifying and improving the truck side frame.

Other objects will appear from time to time throughout the specification and claims.

The invention is illustrated more or less diagrammatically in the accompanying drawings, wherein:

FIGURE 1 is a section through a railroad car truck and associated parts with parts in section and parts in elevation;

FIGURE 2 is a half elevation in part section along the line 2—2 of FIGURE 3 of the frame of the truck;

FIGURE 3 is a plan view of part of the truck assembly;

FIGURE 4 is a drawing similar to FIGURE 1 showing a modified form;

FIGURE 5 is a half elevation in part section along the line 5—5 of FIGURE 6 of a modified form;

FIGURE 6 is a drawing similar to FIGURE 3 of the modified form.

Like parts are indicated by like numerals throughout the specification and drawings.

The truck includes windowed side frames 1 on each side of the truck. A tubular transom 2 extends through the windows in the side frames resting on the bottom of the windows and keyed therein by pins 3. The tubular transom is open at both ends. Intermediate its ends it carries a female center plate 4 adapted to be engaged by a male center plate 5 which depends downwardly from a car bolster 6 which in turn supports the conventional type of car center sill 7. The car bolster 6 carries car bearing pads 8 to cooperate with the truck assembly as will hereinafter appear.

The transom is reinforced by collars 9 encircling apertures 10 near each side frame. Associated with each aperture is a T-shaped stub bolster which includes a base plate 11 resting upon a plurality of coil springs 12 which in turn rest upon the bottom of the transom. Reinforcing webs 13 extend upwardly from each spring base plate 11 to stiffen and assist in supporting the truck bolster column 14 which projects upwardly through the aperture 10, being guided thereby and terminates in a truck bearing pad 15 upon which the pad 8 rests.

Shoulders 16 extending laterally from the column 14 joint it to the base plate 11 and are recessed at 17 to receive pivot pins 18 which pass through rocker arms 19, the latter extending outwardly through ports 20 on opposite sides of the tubular transom. Equalizing rods 21 parallel with and on each side of the transom are rotatably mounted in brackets 22 projecting outwardly from the transom and each end of each equalizing rod 21 is keyed to a rocker arm 19.

When load is applied to a column 14, near one end of the transom tending to compress the springs associated with its base plate 11, this depresses the two rocker arm inner ends downwardly, rotates the equalizing rods 21 to rock the arms at the other end of the transom to compel the base plate on the other side of the truck to move down, compressing the springs associated with it on the opposite side of the truck.

This arrangement insures that the pads 8 on both sides of the truck where they apply the car load to the stub bolsters move downwardly together, thus providing equal support relationship, equal contact relationship between both sides of the car and the truck, and thus stabilizing the car.

The sole purpose under these circumstances of the center plates is to maintain the car and truck in proper pivotal relation, the male and female center plate elements being free to move vertically as permitted by the compression and expansion of the springs and no load is applied to or carried by the center plates.

Referring to the modified form of FIGURES 4, 5 and 6, the tubular transom 23, unlike transom 2 extends beyond the car trucks 1 and terminates in mantles 24 having vertical flanges 25 to which are bolted anchor plates 26 in line with torque rods 27 which are supported on the transom and related to the rocker arms 19 just as are the rocker arms of FIGURES 1, 2 and 3.

The difference here is that the torque rods 27, unlike the rods 21, extend to the end of the transom and are keyed to the plates 26. The operation of the T-shaped stub bolsters and their relationship with the springs is exactly the same in the modified form as in the first mentioned form but since the torque rods or shafts 27 are keyed to the abutment plates 26, rotary movement imparted to the rods 27 by the rocker arms 19, loads the rods in torque and the rods instead of merely transferring movement from one rocker arm to the other, also resist such movement in torque by virtue of the fact that they are keyed at both ends on the anchor plates against rotary movement.

The rods 27 in this case serve also as torque rod springs and because their frequency is different from the frequency of the coil springs, the two frequencies tend to damp each other out and minimize excessive spring vibration just as is the case with respect to the well known friction shoes so often used to limit or control up and down movement of the spring.

Under some circumstances the coil springs might be omitted, in which case the entire load of the car would be carried by the two torque rod springs just as in common enough in automobile practice.

It is claimed:
1. In a railroad car truck, two parallel, windowed, spaced apart frames, a tubular transom generally rectangular in cross section extending at each end into and anchored in one of the windows, the top wall of the transom being apertured adjacent each side frame, a vertically disposed stub bolster projecting upwardly through and guided for vertical movement in each aperture, load carrying springs in the transom, supporting the stub bolsters, a car bolster above the transom, inter-penetrating male and female center plates between it and the transom, the car bolster resting upon and being entirely supported by the stub bolsters, the side walls of the transom being slotted in line with the bolsters, equalizing rods rotatably mounted on the transom generally parallel therewith, equalizing levers rigidly attached to the rods, entering the transom through said slots and in pivotal relationship to the stub bolsters.

2. The device of claim 1 characterized by the fact that the equalizing rods extend outwardly through, though out of contact with the truck frames, means on the ends of the transom for holding the outboard ends only of the stabilizing rods against rotation.

(References on following page)

References Cited

UNITED STATES PATENTS

| | | | |
|---|---|---|---|
| 784,837 | 3/1905 | Cliff | 105—202 X |
| 2,066,602 | 1/1937 | Barrows et al. | 105—197 |
| 2,166,769 | 7/1939 | Rabe | 105—224 |
| 2,267,589 | 12/1941 | Eskergian | 105—198 |
| 2,352,162 | 6/1944 | Buckwalter | 105—197.2 |
| 2,403,045 | 7/1946 | Buckwalter | 105—197 |
| 2,576,367 | 11/1951 | Spearman | 105—199 |
| 2,751,857 | 6/1956 | Heater et al. | 105—197 |
| 3,212,460 | 10/1965 | Peras | 105—199 X |

ARTHUR L. LA POINT, *Primary Examiner.*

H. BELTRAM, *Assistant Examiner.*